Aug. 7, 1923.
W. C. HUNTER
BRAKE SLACK ADJUSTER
Filed Sept. 9, 1921
1,463,821
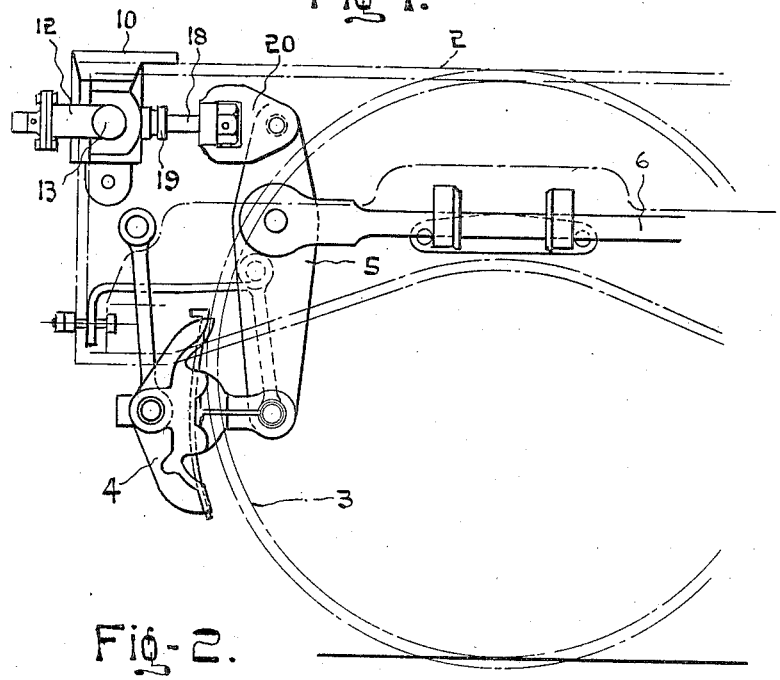
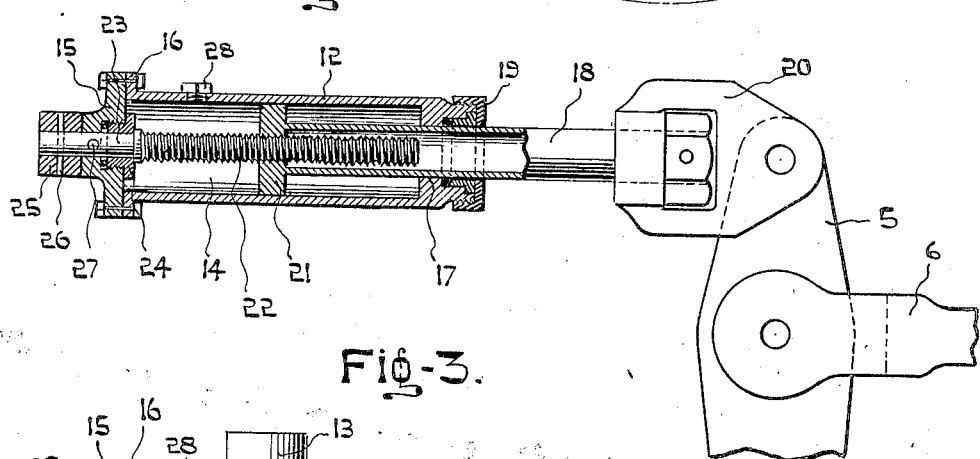
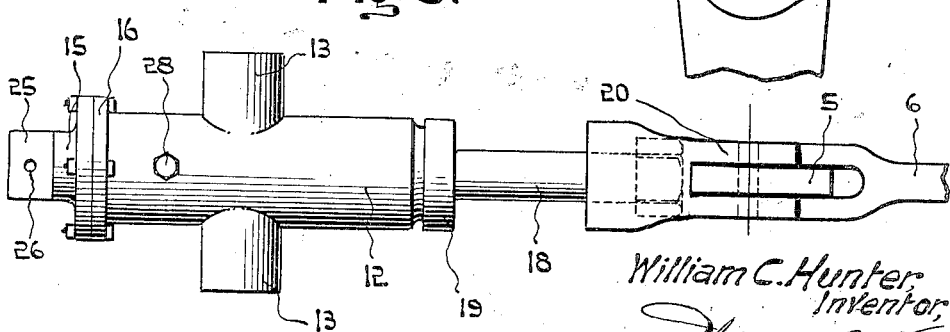
William C. Hunter,
Inventor,
Attorney.

Patented Aug. 7, 1923.

1,463,821

UNITED STATES PATENT OFFICE.

WILLIAM COOK HUNTER, OF MONTREAL, QUEBEC, CANADA.

BRAKE SLACK ADJUSTER.

Application filed September 9, 1921. Serial No. 499,553.

*To all whom it may concern:*

Be it known that I, WILLIAM COOK HUNTER, of the city of Montreal, Province of Quebec, Dominion of Canada, a subject of the King of Great Britain, have invented certain new and useful Improvements in Brake Slack Adjusters; and I do hereby declare that the following is a full, clear, and exact description thereof.

My invention relates to means for shifting the point of fulcrum of a truck lever of a brake gear, more particularly clasp brake gear to take up slack therein produced by wear of the brake shoes and other causes.

Heretofore brake slack adjusters in most instances particularly those which are manually operated have been rendered useless owing to the fact that the adjustable parts thereof were exposed to the atmosphere and became so corroded that it was almost impossible to effect an adjustment.

The object of the present invention is to overcome this serious defect by providing a construction in which the relatively adjustable parts will be housed and immersed in a lubricating bath.

To this end my invention consists of the combination, construction and particular arrangement of the parts hereinafter described and pointed out in the claims.

For full comprehension, however, of my invention reference must be had to the accompanying drawings in which similar reference characters indicate the same parts and wherein:

Figure 1 is a side elevation of a part of a clasp brake gear of a truck provided with my invention the truck frame being indicated in chain lines;

Figure 2 is a part elevation and part longitudinal sectional view of my improved slack adjuster drawn to a larger scale; and Figure 3 is a plan view thereof.

Referring to the accompanying drawings one end of the frame of a truck is indicated at 2, one of the wheels thereof at 3, a brake head at 4, brake lever at 5 and a connection rod at 6. Only the parts of the brake gear which are directly associated with my improved slack adjuster are illustrated as the remainder of the brake rigging is of the usual construction and forms no part of the present invention, that type to which the latter is particularly adapted being known as "clasp brake gear."

A pair of my improved slack adjusters are located at the end of the truck opposite to the end from which the brake gear is operated and as both with their associated parts are alike in all respects I shall describe but one.

A bracket 10 is rigidly secured to one end of each side sill of the truck frame and a cylindrical housing 12 is mounted therein, the latter having trunnions 13 located substantially midway its length and journalled in the bracket to permit of a slight rocking movement of the housing therein. The housing is hollow to present a chamber 14 adapted to contain a lubricant and one end is closed by a head 15 bolted to a circumferential flange 16. The opposite end has a reduced opening 17 through which a fulcrum-adjusting rod 18 passes with a snug sliding fit, leakage of the lubricant at this point being prevented by a stuffing box 19. The rod 18 is tubular and its outer end is operatively connected to the upper end of the brake lever as at 20. Its inner end terminates in a nut 21 which loosely fits the housing to permit of the passage of the lubricant during relative adjustment. The nut is centrally bored and tapped to receive an adjusting screw 22 extending axially throughout the length of the housing and having one end 23 of smooth exterior and projecting through an opening in the housing head 15, the opening being of a diameter to snugly fit the screw without hindering a turning movement thereof and being rendered watertight by a stuffing box 24. The protruding end of the screw is provided with a removable squared head 25 which is secured to the former by a pin 26. The screw is adapted to be locked against rotation by another pin 27 which is passed therethrough and through the head 15.

The housing is provided with a filler opening closed by a plug 28 to enable it to be filled with any desired lubricant.

From the foregoing description it will be seen that all the vital parts of the adjuster, that is to say the threaded parts which secure the adjustment are completely enclosed and as a further safeguard such parts are immersed in a lubricant bath which positively eliminates any possibility of corrosion thereof.

In the operation of the adjuster when it is desired to take up slack in the brake gear the pin 27 is removed and the screw 22 turned up by any suitable wrench until the slack is taken up, the turning movement causing the fulcrum adjusting rod through nut 21 to feed along the screw.

What I claim is as follows:

1. In a brake gear slack adjuster the combination with a closed housing adapted to contain a lubricant of manually adjustable means located within said housing and immersed in said lubricant.

2. A brake gear slack adjuster including a pair of members in screw-threaded engagement and means completely enclosing the said members and adapted to contain a lubricant for the purpose set forth.

3. In a railway car truck, the combination with the frame thereof and a bracket rigidly mounted thereon, of a brake gear slack adjuster including a pair of members in screw-threaded engagement and means enclosing said members and pivoted in said bracket.

4. In a railway car truck the combination with the frame thereof and a bracket rigidly mounted thereon, of a brake gear slack adjuster including a device for adjusting the slack in said brake gear and means pivotally mounted in said bracket and enclosing said device, said means being adapted to contain a lubricant for the purpose set forth.

5. In a railway car truck the combination with the frame thereof and a bracket rigidly mounted thereon, of a brake gear slack adjuster including a pair of members in screw-threaded engagement and a housing enclosing said members and pivotally mounted in said bracket, said housing being adapted to contain a lubricant for the purpose of immersing the said members therein.

6. In a railway car truck the combination with the frame thereof and a bracket rigidly mounted thereon and a brake lever of a cylindrical housing mounted in said bracket and adapted to have a rocking movement therein, said housing having an opening in one end, a tubular fulcrum adjusting rod having one end operatively connected to said brake lever and having its opposite end slidably extending through said opening and terminating in a nut, a screw extending axially throughout the length of the housing and in threaded engagement with said nut, one end of said screw being journalled in the end of said housing opposite to that containing the opening and means preventing axial movement of said screw whereby the said rod is caused to feed axially when the screw is turned.

7. In a railway car truck the combination with the frame thereof and a bracket rigidly mounted thereon and a brake lever of a cylindrical housing mounted in said bracket and adapted to have a rocking movement therein, said housing having an opening in one end, a tubular fulcrum adjusting rod having one end operatively connected to said brake lever and having its opposite end slidably extending through said opening and terminating in a nut, a screw extending axially throughout the length of the housing and in threaded engagement with said nut, one end of said screw being journalled in the end of said housing opposite to that containing the opening and means preventing axial movement of said screw whereby the said rod is caused to feed axially when the screw is turned and means for locking the screw against rotation.

In testimony whereof I have signed my name to this specification in the presence of two witnesses:

WILLIAM COOK HUNTER.

Witnesses:
 GORDON G. COOKE,
 HARRIETTE McDONALD.